(12) United States Patent
Ramirez

(10) Patent No.: US 10,786,113 B2
(45) Date of Patent: Sep. 29, 2020

(54) SCROLL-UP PORTABLE BARBEQUE GRILL

(71) Applicant: Jose Ramirez, West Jordan, UT (US)

(72) Inventor: Jose Ramirez, West Jordan, UT (US)

( * ) Notice: Subject to any disclaimer, the term of this patent is extended or adjusted under 35 U.S.C. 154(b) by 380 days.

(21) Appl. No.: 15/817,984

(22) Filed: Nov. 20, 2017

(65) Prior Publication Data

US 2019/0150664 A1    May 23, 2019

(51) Int. Cl.
*A47J 37/07*    (2006.01)

(52) U.S. Cl.
CPC .... *A47J 37/0763* (2013.01); *A47J 2037/0777* (2013.01); *A47J 2037/0795* (2013.01)

(58) Field of Classification Search
CPC .................. A47J 2037/0795; A47J 2037/0777
See application file for complete search history.

(56) References Cited

U.S. PATENT DOCUMENTS

| 781,758 | A | * | 2/1905 | Annin | A47J 37/0763 |
| | | | | | 126/30 |
| 1,309,049 | A | * | 7/1919 | Syrett | A47B 3/0815 |
| | | | | | 248/439 |
| 3,461,634 | A | * | 8/1969 | Curtis | A47J 37/06 |
| | | | | | 52/645 |
| 3,975,999 | A | * | 8/1976 | Carroll | A47J 37/0763 |
| | | | | | 99/449 |
| 4,393,857 | A | * | 7/1983 | Sanford | F24B 1/205 |
| | | | | | 126/30 |
| 7,080,640 | B2 | * | 7/2006 | Sanders | A47J 33/00 |
| | | | | | 126/30 |

* cited by examiner

*Primary Examiner* — Jason L Vaughan
*Assistant Examiner* — Amanda Kreiling
(74) *Attorney, Agent, or Firm* — Lyman Moulton, Esq.; Moulton Patents, PLLC

(57) ABSTRACT

A scroll-up portable grill assembly, system and method disclosed include grill rods having at least one locking ring disposed on a length of a respective grill rod, each locking ring disposed angularly to the length of the respective grill rod. Also, at least one roller chain is disposed in an angular connection with the grill rods, the roller chain configured to connect the grill rods into a single chain initially resembling a scroll. Additionally, at least one locking rod is insertable through a portion of or through all of the locking rings to give a rigid planar structure to a portion of or to all of the scroll grill. Furthermore, length adjustable legs are attachable to one of the grill rods, the roller chain, the locking rod and a grill rod angle bar termination, the adjustable legs configured to pivot and angularly extend from the grill.

15 Claims, 7 Drawing Sheets

SECTION "A"

SCROLL-UP PORTABLE BARBEQUE GRILL

BACKGROUND OF THE INVENTION

Conventional barbeque grills are typically large one-piece surfaces which most usually require a pickup truck or a van to haul around if one wants to grill away from home. Smaller grills can fit into cars but do not offer the grilling space for a family or for a party without cooking several batches of food. Additionally, transporting a grill after use when it is greasy can get the inside of a van or the bed of a truck greasy too, not to mention everything in between the barbeque site and home.

Furthermore, hikers would love to have some type of portable grill short of the heavy and space consuming flat grills that are commercially available. Of a necessity, metal is required for the grilling surface because it is fire resistant and durable. Other fire proof materials are too expensive for consumer applications. A grill somehow small enough to fit inside a domestic dishwasher yet large enough for a family barbeque would be great for cleaning convenience.

Therefore, and for other reasons not specifically described herein, there has been a long felt need in the market for a barbeque grill that is somehow large enough to cook all the food at once for a family or party gathering and that will be transportable in a compact car and washable in a domestic dishwashing machine at a price point affordable by an average consumer.

SUMMARY OF THE INVENTION

A portable grill assembly, system and method disclosed include a plurality of grill rods, each grill rod having at least one locking ring disposed on a length of a respective grill rod, each locking ring disposed angularly to the length of the respective grill rod. Also, at least one roller chain is disposed in an angular connection with the plurality of grill rods, the roller chain configured to connect the grill rods into a single chain initially resembling a scroll. Additionally, at least one locking rod is insertable through a portion of or through all of the plurality of locking rings to give a rigid planar structure to a portion of or to all of the scroll grill. Furthermore, a plurality of length adjustable legs are attachable to one of the grill rods, the roller chain, the locking rod and a grill rod angle bar termination, the adjustable legs configured to pivot and angularly extend from the grill.

A portable grill assembly includes a plurality of grill rods, each grill rod having at least one locking ring disposed on a length of a respective grill rod, each locking ring disposed angularly to the length of the respective grill rod. The disclosed assembly also includes a plurality of chain links formed from flanging ends of the plurality of grill rods, a chain link of the plurality of chain links configured in one piece with a grill rod of the plurality of grill rods rolled up into a single chain resembling a scroll. Furthermore, the disclosed assembly includes at least one locking rod insertable through a portion of or through all of the plurality of locking rings to give a rigid planar structure to a portion of or to all of the scroll grill.

A disclosed method includes providing a plurality of grill rods, each grill rod having at least one locking ring disposed on a length of a respective grill rod, each locking ring disposed angularly to the length of the respective grill rod. The method also includes disposing at least one roller chain in an angular connection with the plurality of grill rods, the roller chain configured to connect the grill rods into a single chain initially resembling a scroll. The method additionally includes inserting at least one locking rod through a portion of or through all of the plurality of locking rings to give a rigid planar structure to a portion of or to all of the scroll grill. The method furthermore includes attaching a plurality of length adjustable legs to one of the grill rods, the roller chain, the locking rod and a grill rod angle bar termination, the adjustable legs configured to pivot and angularly extend from the grill.

Other aspects and advantages of embodiments of the disclosure will become apparent from the following detailed description, taken in conjunction with the accompanying drawings, illustrated by way of example of the principles of the disclosure herein.

Figure 1:
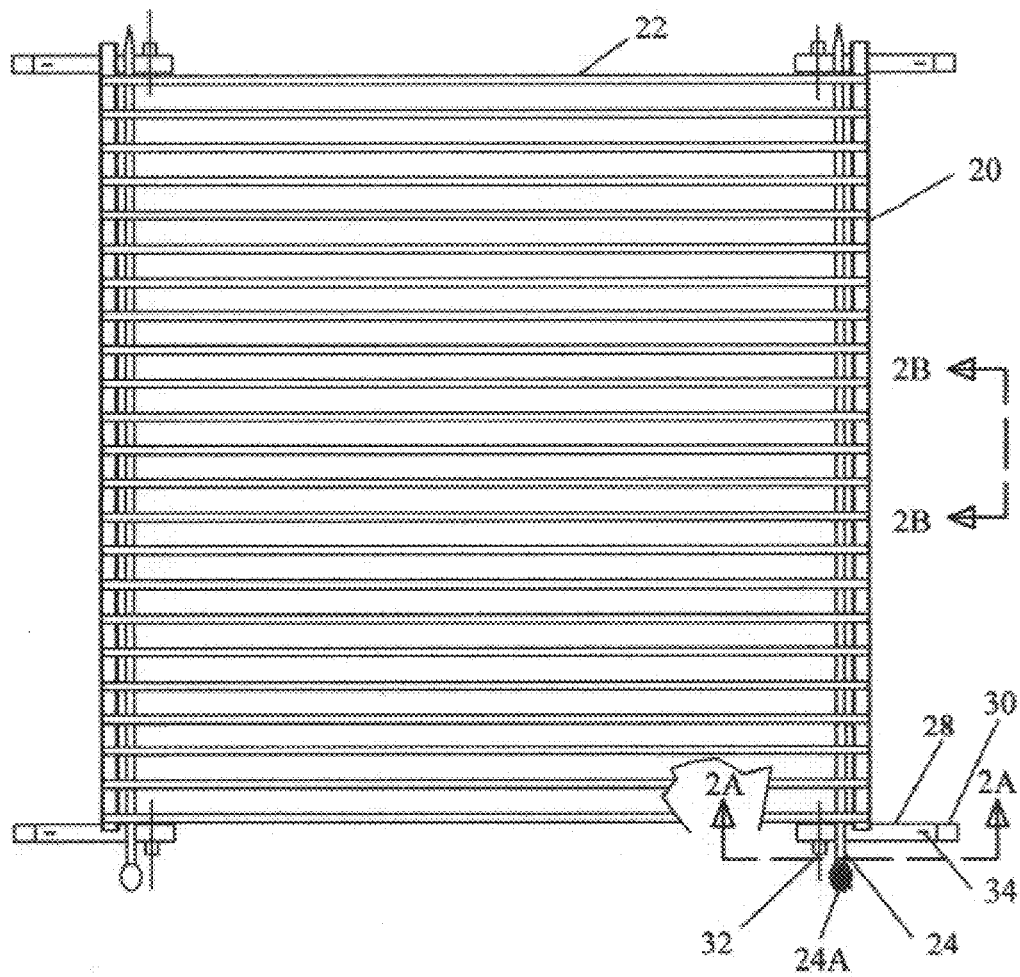
FIG. 1 is a top plan view showing the assembled ready to use roll-up scroll barbeque grill in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "torque sensitive" refers to the ability of the disclosure to sense the torque force necessary to twist or turn and dial the grinder guard into a locking position relative to the annulus which is clamped onto a grinder hub. The torque force necessary is just enough to urge the grinder guard from one locked position into another different locked position but also enough to overcome most operating forces on the grinder guard such as resulting from grinding debris and operator bumping motions thereto. Also throughout the present disclosure, the term "adjustable locking" refers to a locking mechanism that allows adjustments to various positions between locking into a semi-temporary placement for operation of a grinder. The grinder referred to in the present disclosure can be a portable handheld unit or it can be a table top fixed unit. The grinder guard assembly and device as disclosed operates and functions in the same and similar manner regardless of the status of the grinder. In fact, the disclosure may be equally and similarly applied to any circular or rotary power tool where protection from debris created by an abrasive wheel or cutting blade is found.

A lightweight portable scrolling grill with a rigid frame for cooking and a flexible frame to easily roll-up and place in a heavy duty bag or tube to transport and store the grill is disclosed. The portable grill has adjustable legs to allow the user to get an optimum grilling position. A user of the grill can easily unroll a portion of the grill or unroll the complete length of the grill and adjust the height to begin grilling in any chosen place.

A flexible roller chain mechanism comprises the side rods of the grill which can be locked in place with rotatable channel shaped rails or removable locking rods which are threaded through locking rings to hold the grill in a stable grilling position. The disclosed portable scrolling grill is stable, easy to setup and take down, uncomplicated with few parts, and easily adjusted to a comfortable and convenient cooking height.

FIG. 1 is a top plan view showing the assembled ready to use roll-up scroll barbeque grill in accordance with an embodiment of the present disclosure. The depiction includes channel shaped locking side bars 50 configured to enclose the roller chain mechanism (not shown) on three sides. Grill rods 22 are attached to the roller chain mechanism. The locking bars hold the chain inside and hold the grill in a flat stable position. Adjustable legs 28 hold the grill in an upright position over a fire or heat source. The depiction also includes a roller chain mechanism 20, locking rods 24 and attached handles 24A, a leg pressure locking pin 34, a pivot axis 32 and adjustable leg bar 30.

The grill is made ready for transport by a pivot of the legs around the pivot axis 32 to fold up with the locking side bars to put the grill in a roll-up position. To take down the user would pivot the legs to be parallel with the locking bars, rotate locking bars to be parallel with the grill rods, and roll into a compact rollup position.

Figure 2:
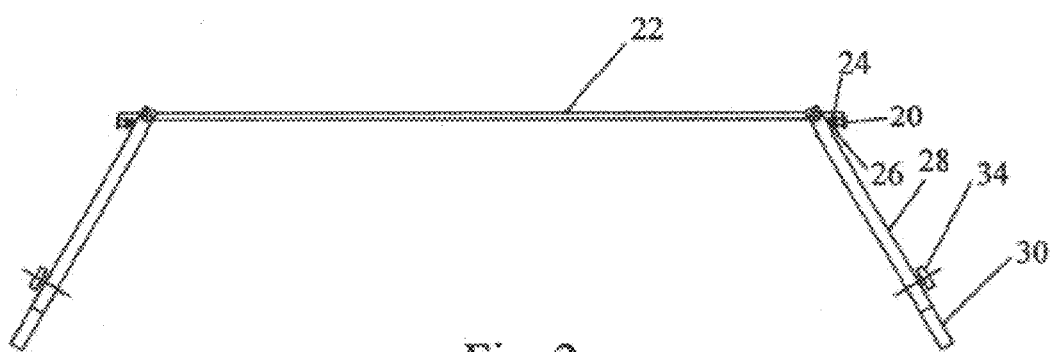
FIG. 2 is a side plan view of the roll-up scroll grill showing the roller chain mechanism with locking rods and attached handles to hold the grill in a ready to use position in accordance with an embodiment of the present disclosure.

FIG. 2 is a side plan view of the roll-up scroll grill showing the roller chain mechanism with locking rods and attached handles to hold the grill in a ready to use position in accordance with an embodiment of the present disclosure. The roller chain mechanism 20 engages with the locking rods 24 and the attached handles 24A in the threaded end to hold the rollup grill in a ready to use position. The legs are rotated around a leg pivot axis and can be easily adjusted by turning the pressure locking pin 34. The adjustable bar 30 can be moved by sliding out of the leg and adjusting the pressure lock. The present figure depicts the locations 2A and 2B views shown in FIGS. 3 and 4.

Figure 3:
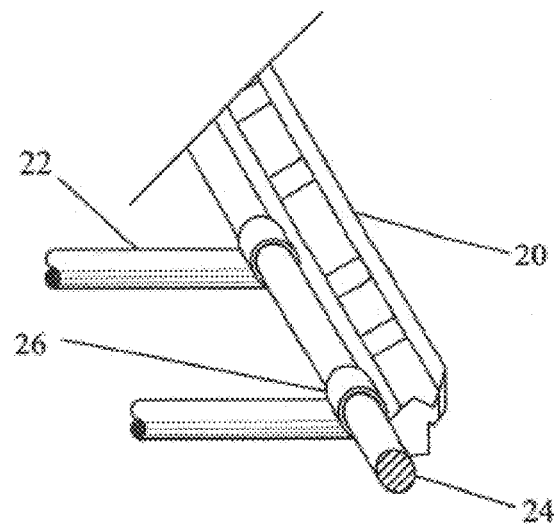
FIG. 3 is a close-up detail view of the locking bar in the rings of the grill bars and chain in accordance with an embodiment of the present disclosure.

FIG. 3 is a close-up detail view of the locking bar in the rings of the grill bars and chain in accordance with an embodiment of the present disclosure. The depiction includes the grill rods 22, the locking rings 26, the locking rod 24 and the chain link mechanism 20 in an assembled and locked configuration.

Figure 4:
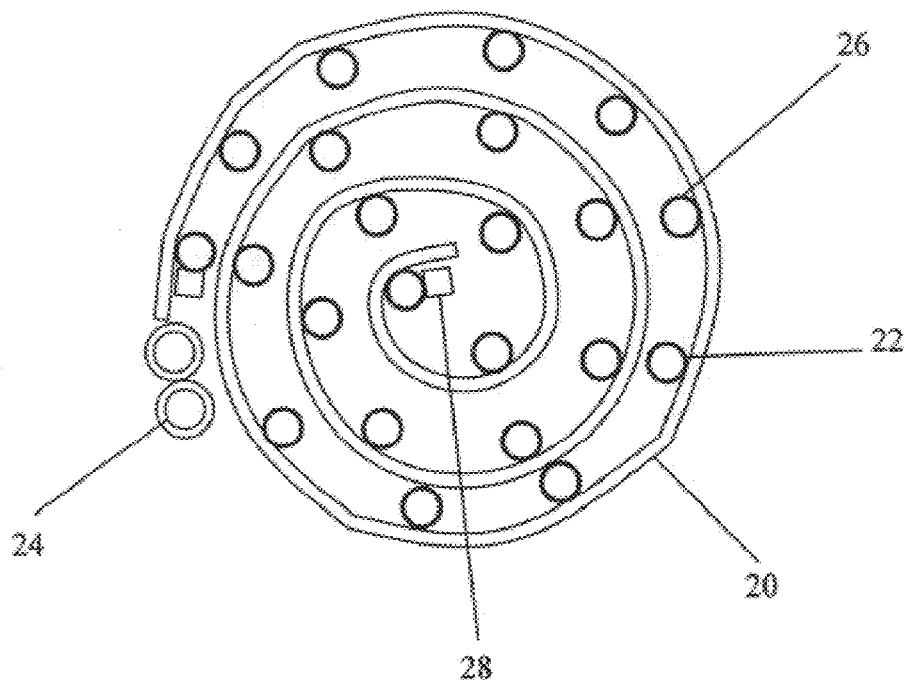
FIG. 4 is an end view of the roll-up scroll grill in a roll-up position in accordance with an embodiment of the present disclosure.

FIG. 4 is an end view of the roll-up scroll grill in a roll-up position in accordance with an embodiment of the present disclosure. The legs 28 are rotated around the leg pivot axis 32 and lying parallel to and alongside the grill rods 22. The grill locking bar rods 24 with attached handles 24A are lying parallel to and alongside the grill rods. Once the grill is rolled up it can be placed in a preferred storage container and transported or stored.

Figure 5:
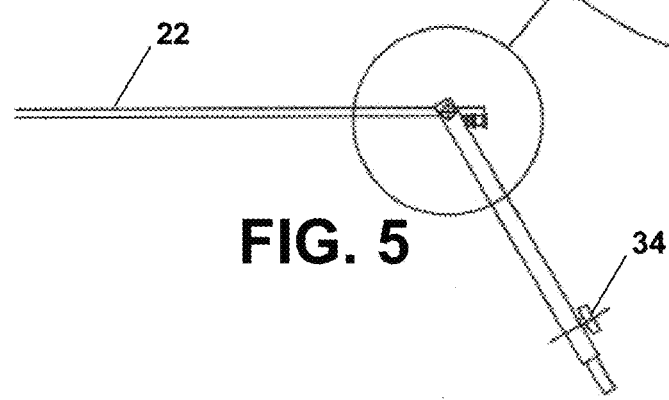
FIG. 5 is a partial sectional end 2A-2A and elevation view showing the rotated legs stopped from rotation by the grill bar locking rod in accordance with an embodiment of the present disclosure.

FIG. 5 is a partial sectional end 2A-2A and elevation view showing the rotated legs stopped from rotation by the grill bar locking rod in accordance with an embodiment of the present disclosure. The rotated legs 28 are stopped from rotation by the grill bar locking rod 24 shown in detail in FIG. 6. The height of the grill can be adjusted by turning the pressure locking pin 34 and sliding the bar inside the leg. The legs can be adjusted to get optimal heating conditions at the grill rods 22 and to accommodate for uneven ground.

Figure 6:
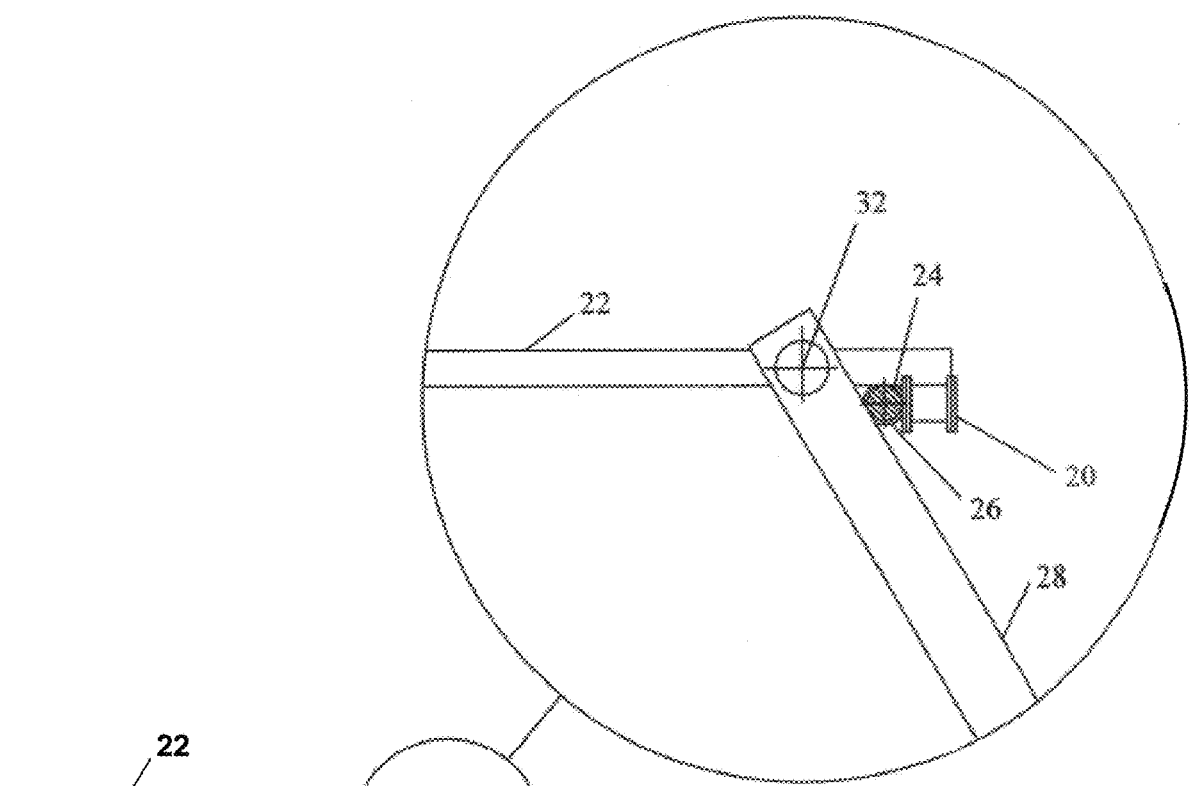
FIG. 6 is a close-up circular view of the leg assembly of the scroll grill in accordance with an embodiment of the present disclosure.

FIG. 6 is a close-up circular view of the leg assembly of the scroll grill in accordance with an embodiment of the present disclosure. When ready for transport, the side legs 28 can be pivoted around the pivot access 32 to be parallel with the grill rods 22. The grill bar locking rod 24 can be removed from the locking rings and placed parallel to the grill rods 22. The chain link mechanism 22 is shown in detail in FIG. 7.

Figure 7:
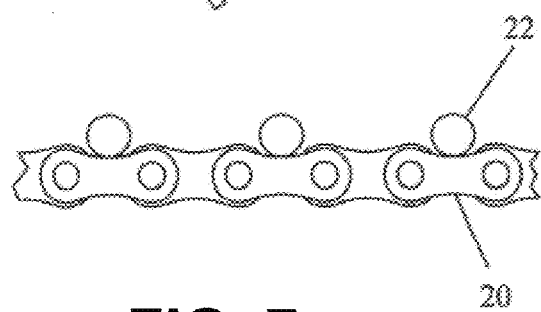
FIG. 7 is a depiction of section 2B-2B of the arrangement of the grill rods and the side support chain in accordance with an embodiment of the present disclosure.

FIG. 7 is a depiction of section 2B-2B of the arrangement of the grill rods and the side support chain in accordance with an embodiment of the present disclosure. The opposite sides of the grill rods 22 are permanently attached to the respective support chain by welding, brazing, or other suitable means.

Figure 8:
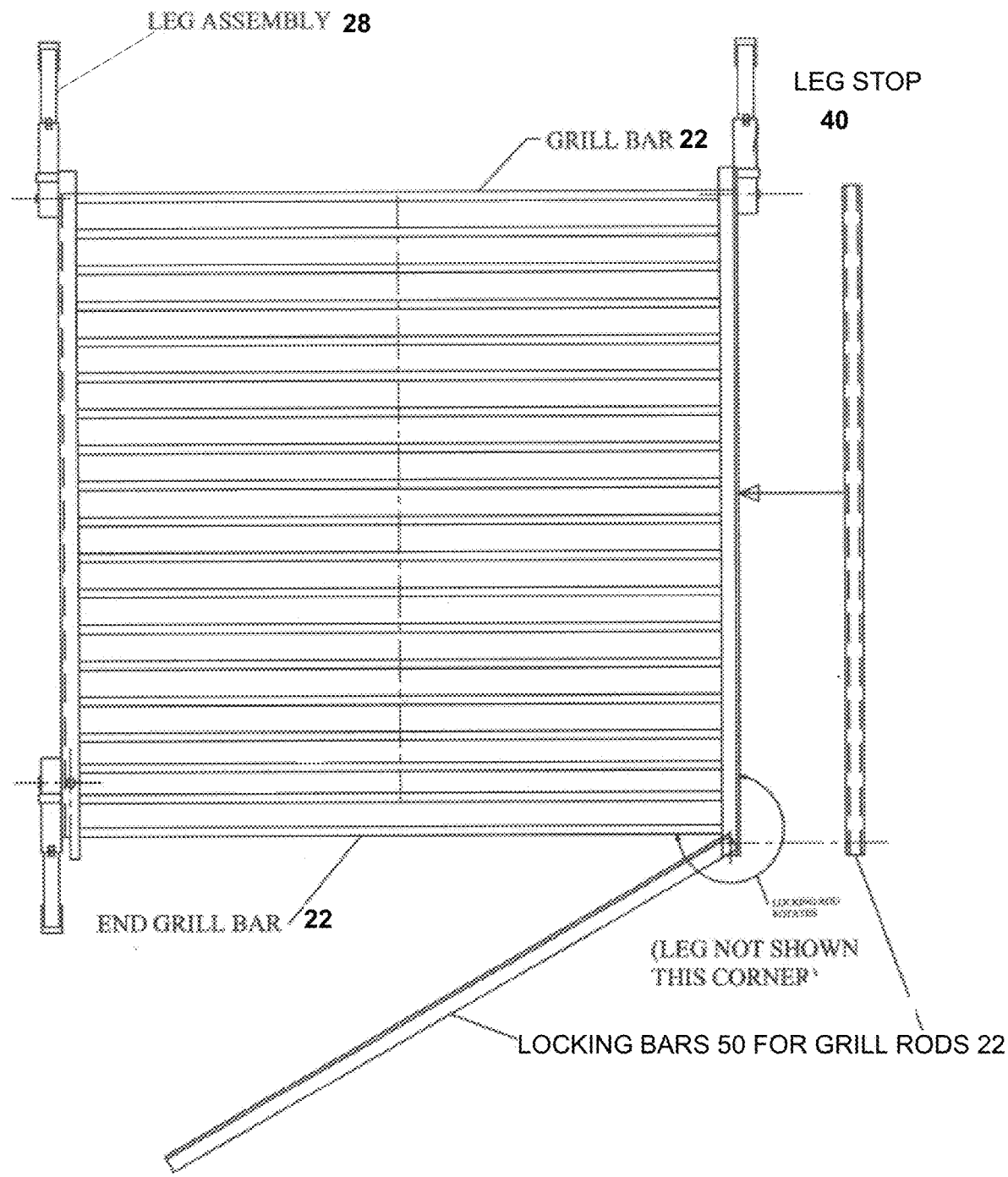
FIG. 8 is a top plan view showing a rotating locking bar of the roll-up scroll barbeque grill in accordance with an embodiment of the present disclosure.

FIG. 8 is a top plan view showing a rotating locking bar of the roll-up scroll barbeque grill in accordance with an embodiment of the present disclosure. The view includes the grill bars 22 from one end of the grill to another end and between, the leg assemblies 28 on each corner of the scroll grill, the leg stops 40 at each leg assembly and the locking bars 50 for the grill rods 22 both on lateral sides and on end sides of the scroll grill.

Figure 9:
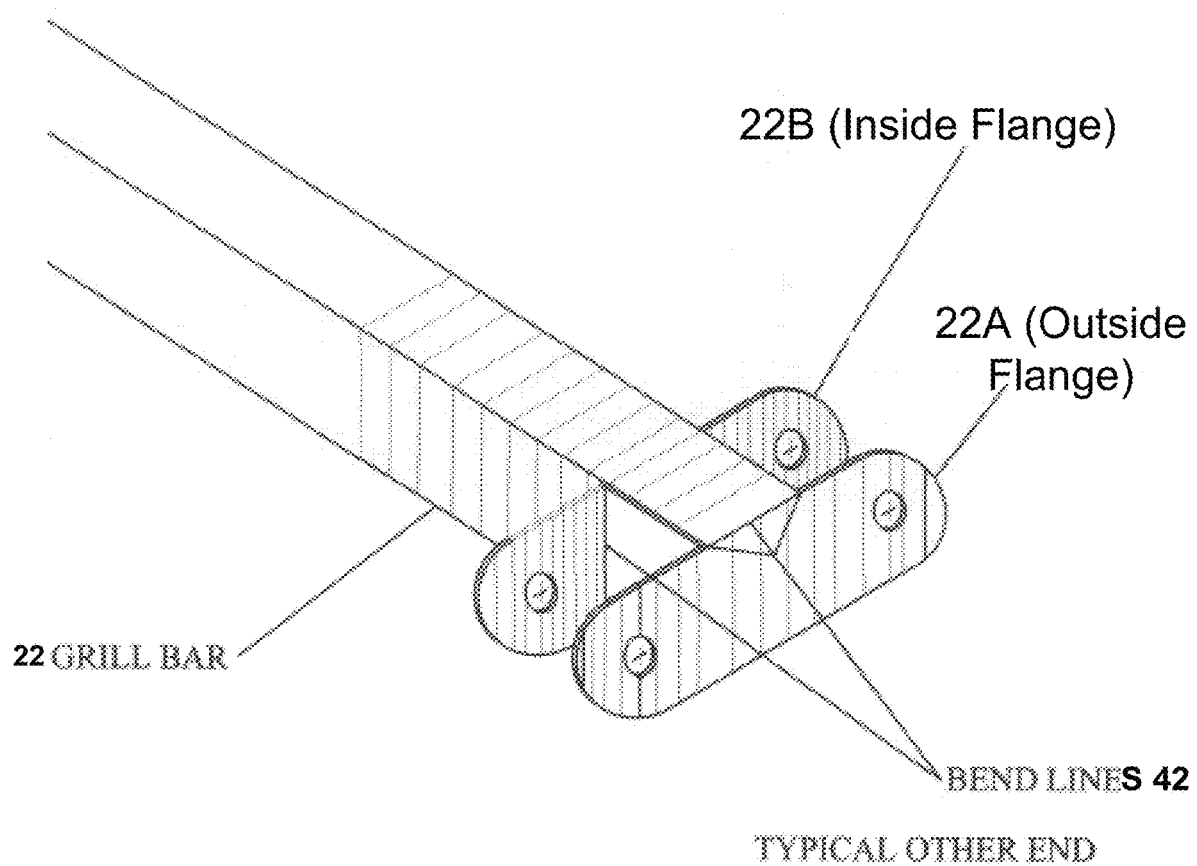
FIG. 9 is a depiction of a one-piece grill bar and flanging chain link in accordance with an embodiment of the present disclosure.

FIG. 9 is a depiction of a one-piece grill bar and flanging chain link in accordance with an embodiment of the present disclosure. The grill bar 22 in this embodiment is a channel rod having an inside flange 22B and an outside flange 22A created from the channel rod stock at bend lines 42. This way the grill bars 22 and the chain link mechanism are one-piece construction. Pins (shown in FIG. 10) attach the links together in a chain link similar to that shown in FIG. 7.

Figure 10:
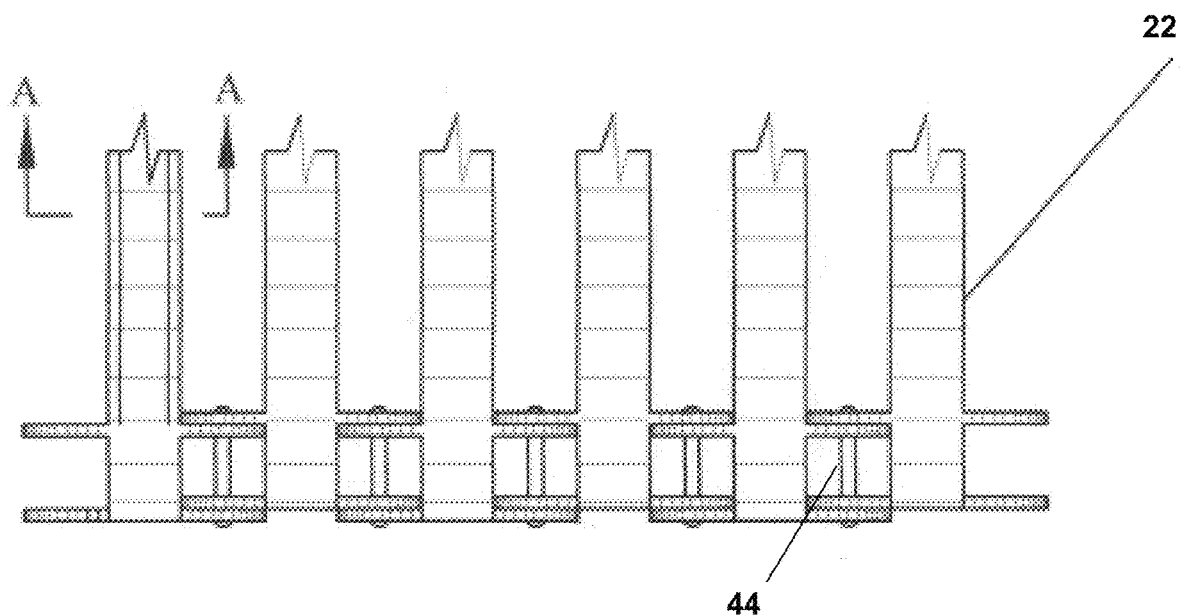
FIG. 10 is a sectional top plan view of the one-piece grill bar and flanging chain link assembled in accordance with an embodiment of the present disclosure.

FIG. 10 is a sectional top plan view of the one-piece grill bar and flanging chain link assembled in accordance with an embodiment of the present disclosure. The grill rods 22 flange out to create the chain links via the connective pins 44.

Figure 11:
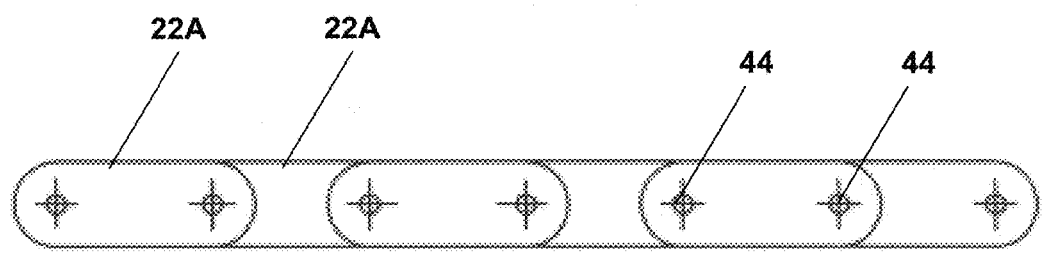
FIG. 11 is a sectional side elevation of the one-piece grill bar and flanging chain link in accordance with an embodiment of the present disclosure.

FIG. 11 is a sectional side elevation of the one-piece grill bar and flanging chain link in accordance with an embodiment of the present disclosure. The grill rods 22 flange out 22A to create the chain links via the connective pins 44.

Figure 12:
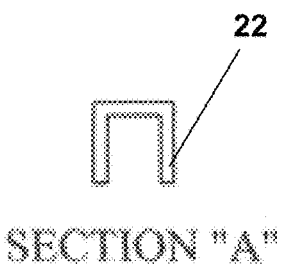
FIG. 12 is a section view through A-A of FIG. 10 in accordance with an embodiment of the present disclosure.

FIG. 12 is a section view through A-A of FIG. 10 in accordance with an embodiment of the present disclosure. The grill rods 22 are comprised of channel stock material in this embodiment.

Figure 13:
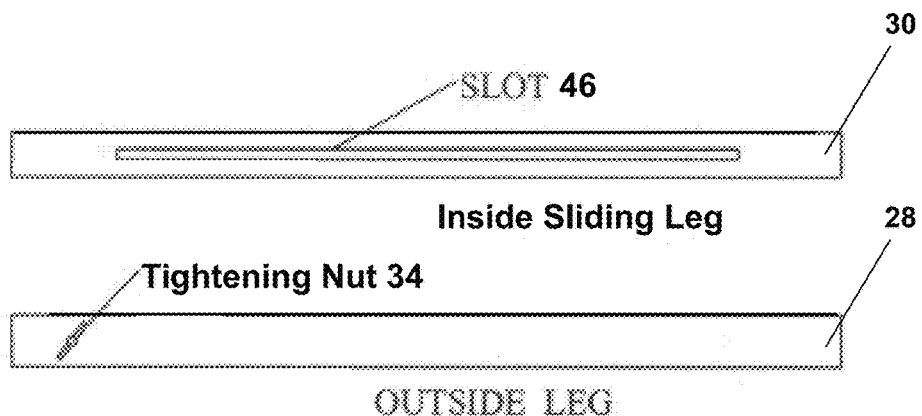
FIG. 13 is a top plan view of the inside sliding leg and the outside leg of the scroll grill in accordance with an embodiment of the present disclosure.

FIG. 13 is a top plan view of the inside sliding leg and the outside leg of the scroll grill in accordance with an embodiment of the present disclosure. The outside leg 28 telescopes over the inside sliding leg 30 and the two legs are mechanically fastened together via the tightening nut 34.

Figure 14:
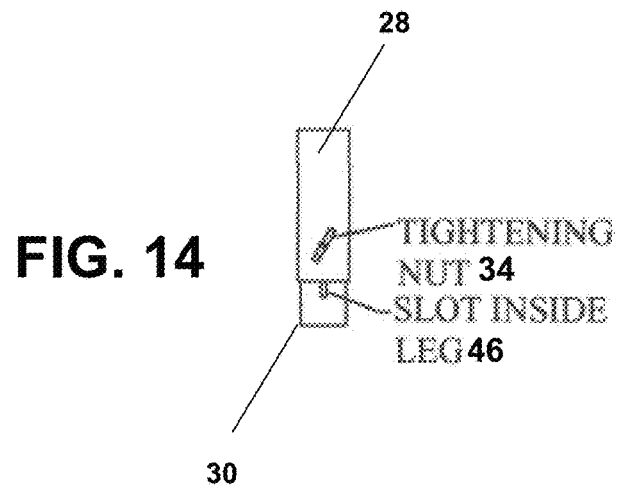
FIG. 14 is an assembled view of the inside sliding leg and the outside leg of the scroll grill in accordance with an embodiment of the present disclosure.

FIG. 14 is an assembled view of the inside sliding leg and the outside leg of the scroll grill in accordance with an embodiment of the present disclosure. The outside leg 28 telescopes over the inside sliding leg 30 and the two legs are mechanically fastened together via the tightening nut 34.

When ready for transport, the side legs can be pivoted around the pivot access 32 to be parallel with the grill rods 22. The grill bar locking rod 24 can be removed from the locking rings and placed parallel to the grill rods 22.

FIG. 4 is a depiction of FIG. 2B of the arrangement of the grill rods and the side support chain in accordance with an embodiment of the present disclosure. The grill rods 22 and the side support chain 20 is depicted. The opposite sides of the grill rods are permanently attached to the support chain by welding, brazing, or other suitable means.

FIG. 11 is a block diagram of a method for guarding a grinder via a torque sensitive locking grinder guard in accordance with an embodiment of the present disclosure.

In an embodiment of the present disclosure of the portable grill assembly the roller chain angular connection with the grill rods is orthogonal. The portable grill assembly further comprises two roller chains, one disposed in an orthogonal connection with the grill rods at one end thereof and another disposed in an orthogonal connection with the grill rods at another end thereof. Also, the locking ring angular disposition to the length of the respective grill rod is an orthogonal disposition thereto.

Embodiments of the portable grill assembly further comprise two locking rods, one insertable through a first plurality of locking rings disposed on an end of the grill rods and another disposed through a second plurality of locking rings disposed on another end of the grill rods. At least one locking rod further comprises a handle on an end thereof, the handle configured for a human hand to enable a force applied therefrom onto the locking rod through the locking rings. The portable grill assembly further comprises an angle bar termination on an end of the roller chain, the angle bar configured as a terminus parallel to the grill rods for the roller chain to give additional structural strength to the rigid planar structure.

Other embodiments of the portable grill assembly are included wherein a link of the roller chain is configured to laterally accept a grill rod. Embodiments of the grill rod comprise a square cross-section. Length adjustable legs are attachable to one of the grill rods, the roller chain, the locking rod and a grill rod angle bar termination, the adjustable legs configured to pivot and angularly extend from the grill. The legs are configured to fold up parallel to the grill rods to put the grill in a scroll up position for transport. A leg rotation locking boss is provided on the grill rod angle bar termination. Furthermore, a pressure locking pin is disposed at a joint of each adjustable leg, the pin configured to lock a leg at a set length.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A portable grill assembly comprising:
a plurality of grill rods, each grill rod having at least one locking ring disposed on a length of a respective grill rod, each locking ring disposed angularly to the length of the respective grill rod;
at least one roller chain disposed in an orthogonal connection with the plurality of grill rods, the roller chain configured to connect the grill rods initially rolled up into a single chain resembling a scroll;
at least one locking rod insertable through a portion of or through all of the plurality of locking rings to give a rigid planar structure to a portion of or to all of the scroll grill;
two roller chains, one disposed in an orthogonal connection with the grill rods at one end thereof and another disposed in an orthogonal connection with the grill rods at another end thereof; and
wherein the locking ring angular disposition to the length of the respective grill rod is an orthogonal disposition thereto.

2. The portable grill assembly of claim 1, further comprising two locking rods, one insertable through a first plurality of locking rings disposed on an end of the grill rods and another disposed through a second plurality of locking rings disposed on another end of the grill rods.

3. The portable grill assembly of claim 1, wherein the at least one locking rod further comprises a handle on an end thereof, the handle configured for a human hand to enable a force applied therefrom onto the locking rod through the locking rings.

4. The portable grill assembly of claim 1, further comprising an angle bar termination on an end of the roller chain, the angle bar configured as a terminus parallel to the grill rods for the roller chain and to give additional structural strength to the rigid planar structure.

5. The portable grill assembly of claim 1, wherein a link of the roller chain is configured to laterally accept a grill rod.

6. The portable grill assembly of claim 1, wherein a grill rod comprises a square cross-section.

7. A portable grill system comprising:
a plurality of grill rods, each grill rod having at least one locking ring disposed on a length of a respective grill rod, each locking ring disposed angularly to the length of the respective grill rod;

at least one roller chain disposed in an angular connection with the plurality of grill rods, the roller chain configured to connect the grill rods into a single chain initially resembling a scroll;

at least one locking rod insertable through a portion of or through all of the plurality of locking rings to give a rigid planar structure to a portion of or to all of the scroll grill; and a plurality of length adjustable legs attachable to one of the grill rods, the roller chain, the locking rod and a grill rod angle bar termination, the adjustable legs configured to pivot and angularly extend from the grill two roller chains, one disposed in an orthogonal connection with the grill rods at one end thereof and another disposed in an orthogonal connection with the grill rods at another end thereof; and wherein the at least one locking rod further comprises a handle on an end thereof, the handle configured for a human hand to enable a force applied therefrom onto the locking rod through the locking rings.

8. The portable grill system of claim 7, wherein the legs are configured to fold up parallel to the grill rods to put the grill in a scroll up position for transport.

9. The portable grill system of claim 7, further comprising a leg rotation locking boss disposable on the grill rod angle bar termination.

10. The portable grill system of claim 7, further comprising a pressure locking pin disposed at a joint of each adjustable leg, the pin configured to lock a leg at a set length.

11. The portable grill system of claim 7, further comprising two locking rods, one insertable through a first plurality of locking rings disposed on an end of the grill rods and another disposed through a second plurality of locking rings disposed on another end of the grill rods.

12. The portable grill system of claim 7, wherein the grip rod angle bar termination on an end of the roller chain is configured as a terminus parallel to the grill rods for the roller chain and to give additional structural strength to the rigid planar structure.

13. The portable grill system of claim 7, wherein each link of the roller chain comprises an inside chamfered plate and an outside rectangular plate.

14. The portable grill assembly of claim 7, wherein the legs comprise adjacent and slidable channel components.

15. A portable grill assembly comprising:

a plurality of grill rods, each grill rod having at least one locking ring disposed on a length of a respective grill rod, each locking ring disposed angularly to the length of the respective grill rod;

a plurality of chain links formed from flanging ends of the plurality of grill rods, a chain link of the plurality of chain links configured in one piece with a grill rod of the plurality of grill rods rolled up into a single chain resembling a scroll; and at least one locking rod insertable through a portion of or through all of the plurality of locking rings to give a rigid planar structure to a portion of or to all of the scroll grill.

* * * * *